…

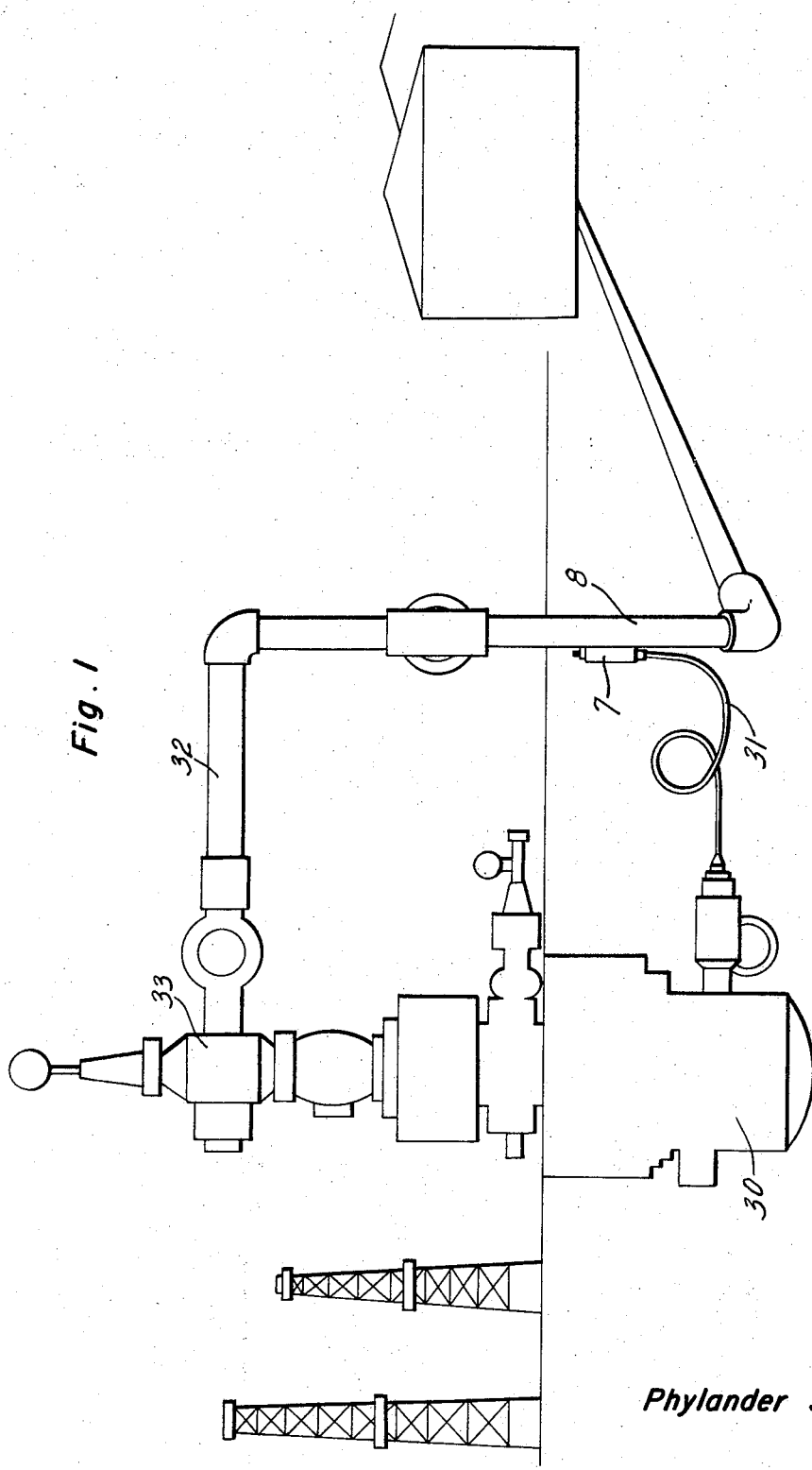
Fig. I
INVENTOR
Phylander S. Adams

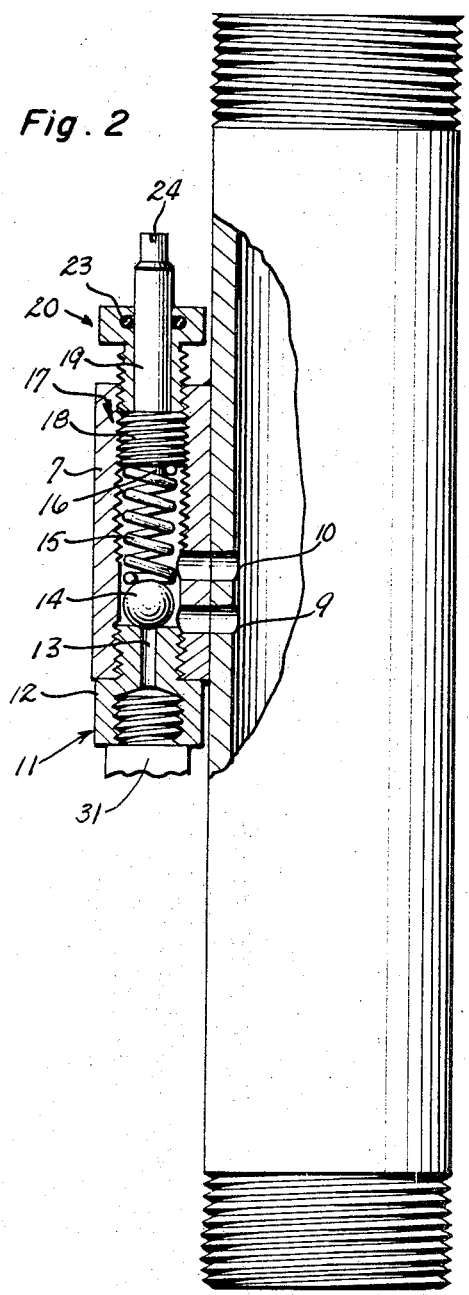
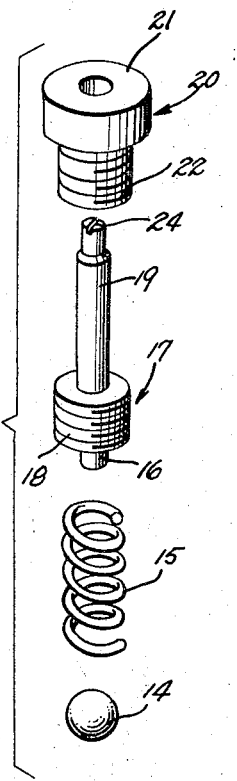
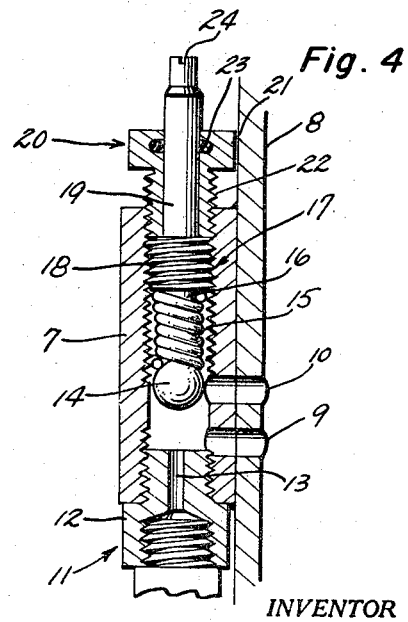

United States Patent Office 3,348,615
Patented Oct. 24, 1967

3,348,615
AUTOMATIC SAFETY RELIEF AND BACK PRESSURE VALVE
Phylander S. Adams, 4175 El Paso St., Beaumont, Tex. 77703
Filed Jan. 6, 1965, Ser. No. 423,673
5 Claims. (Cl. 166—97)

ABSTRACT OF THE DISCLOSURE

An automatic safety relief or back pressure valve for connection between a casing head of an oil well being pumped and the flow line leading from the pump, for controlling casing head gas pressure. It is particularly adapted to provide a means for removing gas from the casing head in such a manner that there is no danger of the valve freezing closed because of the cooling effect of the expanding gas as it is removed from the casing head.

---

This invention relates to safety relief and back pressure valves, and more particularly to a valve of this type that is to be used in oil wells for the removal of casing head gas.

One of the major difficulties of oil well operation is the removal of the casing head gas that accumulates in the annular space between the tubing and the casing as will be understood by those experienced in this art.

It is therefore, the principal object of this invention to provide a safety relief and back pressure valve that will effectively and automatically remove this gas from the oil well.

Another object of this invention is to provide a safety relief and back pressure valve can be adapted to any vertically mounted mandrel of an oil well.

Another object of this invention is to provide an automatic safety relief and back pressure valve that will convert liquid gasses into gas vapor, as will be understood by those experienced in the art after examining the appended drawings.

Still another object of this invention is to provide a safety relief and back pressure valve that will stabilize the fluid in the casing pressure on pumping oil wells.

Other and further objects of this invention will come to mind as the following description proceeds.

The invention is illustrated in the accompanying drawings as follows:

FIGURE 1 is an enlarged side view of this invention installed in the oil well flow line, with the oil wells being shown in the background.

FIGURE 2 is a longitudinal sectional view of this invention in place on the vertical mandrel portion of the flow line of an oil well.

FIGURE 3 is a pictorial exploded view of some of the major parts of this invention.

FIGURE 4 is a longitudinal sectional view of this invention similar to FIG. 2, but showing the valve member in the open position.

Looking now at the drawings where like parts are indicated by like reference numbers throughout the several different views, it will be seen that this invention embodies an internally threaded piece of pipe 7 or its equivalent that is welded onto the mandrel 8 to which its internal chamber is connected by a pair of spaced and parallel passages 9 and 10, that pass through both the wall of the aforesaid piece of pipe 7 and the wall of the mandrel 8. Mandrel 8 forms a portion of flow line 32 leading from pump to the collection system. An inlet plug 11 having a tapped opening extending inward for a distance that is nearly equal to the thickness of the head 12 of the aforesaid inlet plug 11 through which longitudinally extends the centrally located opening 13. Opening 13 communicates with casing head 30 through line 31, as shown in FIG. 1. A ball type valve element 14 is located in the piece of pipe 7 which is hereinafter called the body of this invention. A coil spring 15 has one end resting against the aforesaid ball type valve element 14 while the other end of the same spring fits over the projection 16 of the valve adjusting member 17 that embodies the externally threaded body 18 which is screwed into the aforesaid body 7 of this invention as clearly shown in FIGURES 2 and 4 of the appended drawings.

The just mentioned valve adjusting member 17 also embodies the smooth shank 19 that passes through the longitudinal center of the safety packing gland 20 which is an externally threaded member having a head 21 and external threads 22 that provide a means of this member being screwed into one end of the aforesaid body 7 of this invention. An O-ring 23 is located within the aforesaid head 21. The O-ring fits over the previously mentioned smooth shank 19 of this invention as one can readily see on studying the appended drawings where it is also seen that the outermost end of the aforesaid smooth shank 19 is provided with a slot 24 in which the end of a screwdriver is placed when it is desired to adjust this novel automatic safety relief and back pressure valve.

When this just described invention has been assembled, the valve adjusting member 17 is adjusted by means of a screwdriver as has just been stated. The desired pressure is applied against the ball valve element 14 so that it will release under a predetermined minimum pressure. When the pressure in the centrally located opening 13 of this invention overcomes the pre-set pressure on the aforesaid ball valve element 14 will release gas which is now discharged through the aforesaid passages 9 and 10, and the gas will now flow into the gathering system, as will be understood by those experienced in this particular art. Since gas will freeze at pressure drop, the two passages 9 and 10 will act as a means of providing safety factor to the entire system.

It is to be understood that this invention of mine is subject to any and all changes that may be made in shape, and number of parts which can be of any desired size, so long as the final assembly of the invention will provide a device that falls within the scope and spirit of intent of the appended claims.

What I now claim as new is:

1. In combination with a casing head of an oil well being pumped and a flow line leading from the pump, the improvement comprising an automatic pressure relief safety valve connected between the casing head and the flow line for controlling casing gas pressure, said valve including:

a body member defining a generally elongated chamber, said body member being mounted against the external surface of a portion of said flow line such that the longitudinal axis of said chamber is generally parallel with the central axis of said portion of said flow line, said body member having at least one outlet port communicating with the interior of said portion of a flow line, and said inlet port leading into one end of said chamber;

a valve member mounted in said chamber for controlling gas flow into said chamber through said inlet port;

spring means mounted in said chamber for normally biasing said valve member to the closed position with respect to said inlet port;

adjusting means connected to said body member for adjusting the compression force on said spring means to thereby vary the amount of gas pressure required on said valve member to move said valve member to the open position;

and conduit means communicating between said casing head and said inlet port for passage of gas from said casing head to said inlet port;

whereby pressure inside said casing head is relieved through said conduit means, through said inlet port, through said chamber, and through said outlet port when the casing pressure exceeds the biasing force exerted by said spring means.

2. The invention as claimed in claim 1 including:

a removable plug mounted in the inlet end of said body member and having an axial opening therethrough defining said inlet port;

whereby the size of said inlet port may be varied by replacement of said plug with another plug having a different sized opening therethrough.

3. The invention as claimed in claim 1 wherein:

said portion of said flow line is in the form of a vertically extending mandrel;

and said body member is attached to said mandrel;

and said inlet port leads into the bottom portion of said chamber.

4. The invention as claimed in claim 1 wherein:

said spring means includes a coil spring;

and said adjusting means includes a threaded plug mounted in the other end of said chamber for engaging one end of said spring and adapted to vary the compression force on said spring by turning said threaded plug.

5. The invention as claimed in claim 1 wherein:

said portion of said flow line is in the form of a vertically extending mandrel and said body member is attached to said mandrel in vertical alignment therewith;

a removable plug mounted in the lower end of said body member, said plug having an axial opening therethrough defining said inlet port, whereby the size of said inlet port may be changed by replacement of said removable plug with another plug having a different sized opening therethrough;

said spring means includes a coil spring;

said adjusting means includes a threaded plug mounted in the upper end of said body member and engaging the upper end of said coil spring, whereby the compression force on said spring may be varied by turning said threaded plug;

and including a second outlet port adjacent said at least one outlet port, said outlet ports being adjacent to the inlet end of said body member and in communication with said inlet port when said valve member is moved to the open position by fluid pressure from said casing head, and wherein said valve member is a ball valve.

References Cited

UNITED STATES PATENTS

| | | | |
|---|---|---|---|
| 1,305,964 | 6/1919 | Dickson | 137—539 X |
| 1,567,183 | 12/1925 | Conrader | 166—54 X |
| 1,791,012 | 2/1931 | Ray | 137—535 X |
| 2,649,113 | 8/1953 | Cizek | 137—539 X |
| 2,760,579 | 8/1956 | Kabakoff | 166—75 |
| 2,815,764 | 12/1957 | Bryan | 137—155 |

WILLIAM F. O'DEA, *Primary Examiner.*

D. H. LAMBERT, *Assistant Examiner.*